United States Patent
Bhatia et al.

(10) Patent No.: US 7,856,636 B2
(45) Date of Patent: Dec. 21, 2010

(54) SYSTEMS AND METHODS OF SHARING PROCESSING RESOURCES IN A MULTI-THREADING ENVIRONMENT

(75) Inventors: Rohit Bhatia, Fort Collins, CO (US); Don C. Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1625 days.

(21) Appl. No.: 11/125,859

(22) Filed: May 10, 2005

(65) Prior Publication Data

US 2006/0259907 A1 Nov. 16, 2006

(51) Int. Cl.
G06F 9/46 (2006.01)

(52) U.S. Cl. .................. 718/108; 718/102; 718/104; 718/107

(58) Field of Classification Search ............ 718/1, 718/100, 102, 104, 107, 108
See application file for complete search history.

(56) References Cited

U.S. PATENT DOCUMENTS

| | | | |
|---|---|---|---|
| 5,421,014 A | 5/1995 | Bucher | |
| 5,452,459 A | 9/1995 | Drury et al. | |
| 5,481,706 A | 1/1996 | Peek | |
| 6,016,490 A | 1/2000 | Watanabe et al. | |
| 6,477,597 B1 * | 11/2002 | Sorace et al. | 710/200 |
| 6,493,741 B1 * | 12/2002 | Emer et al. | 718/107 |
| 6,560,629 B1 | 5/2003 | Harris | |
| 6,578,131 B1 | 6/2003 | Larson et al. | |
| 6,983,461 B2 * | 1/2006 | Hutchison et al. | 718/104 |
| 7,137,118 B2 * | 11/2006 | Jahnke | 718/102 |
| 7,487,153 B2 * | 2/2009 | Makhervaks et al. | 1/1 |
| 2003/0041090 A1 * | 2/2003 | Armstrong et al. | 709/106 |
| 2003/0074390 A1 | 4/2003 | Hudson | |
| 2003/0233393 A1 | 12/2003 | Li | |
| 2005/0044319 A1 | 2/2005 | Olukotun | |
| 2006/0117316 A1 * | 6/2006 | Cismas et al. | 718/103 |

* cited by examiner

*Primary Examiner*—Lewis A Bullock, Jr.
*Assistant Examiner*—Willy W Huaracha

(57) ABSTRACT

Systems and methods of sharing processing resources in a multi-threading environment are disclosed. An exemplary method may include allocating a lock value for a resource lock, the lock value corresponding to a state of the resource lock. A first thread may yield at least a portion of the processing resources for another thread. The resource lock may be acquired for the first thread if the lock value indicates the resource lock is available.

14 Claims, 6 Drawing Sheets

Fig. 4

| Entry | Register ID | Memory Address | State |
|---|---|---|---|
| 0 | ID_X | Add_A | 0/1 |
| 1 | ID_Y | Add_B | 0/1 |
| 2 | | | |
| 3 | | | |

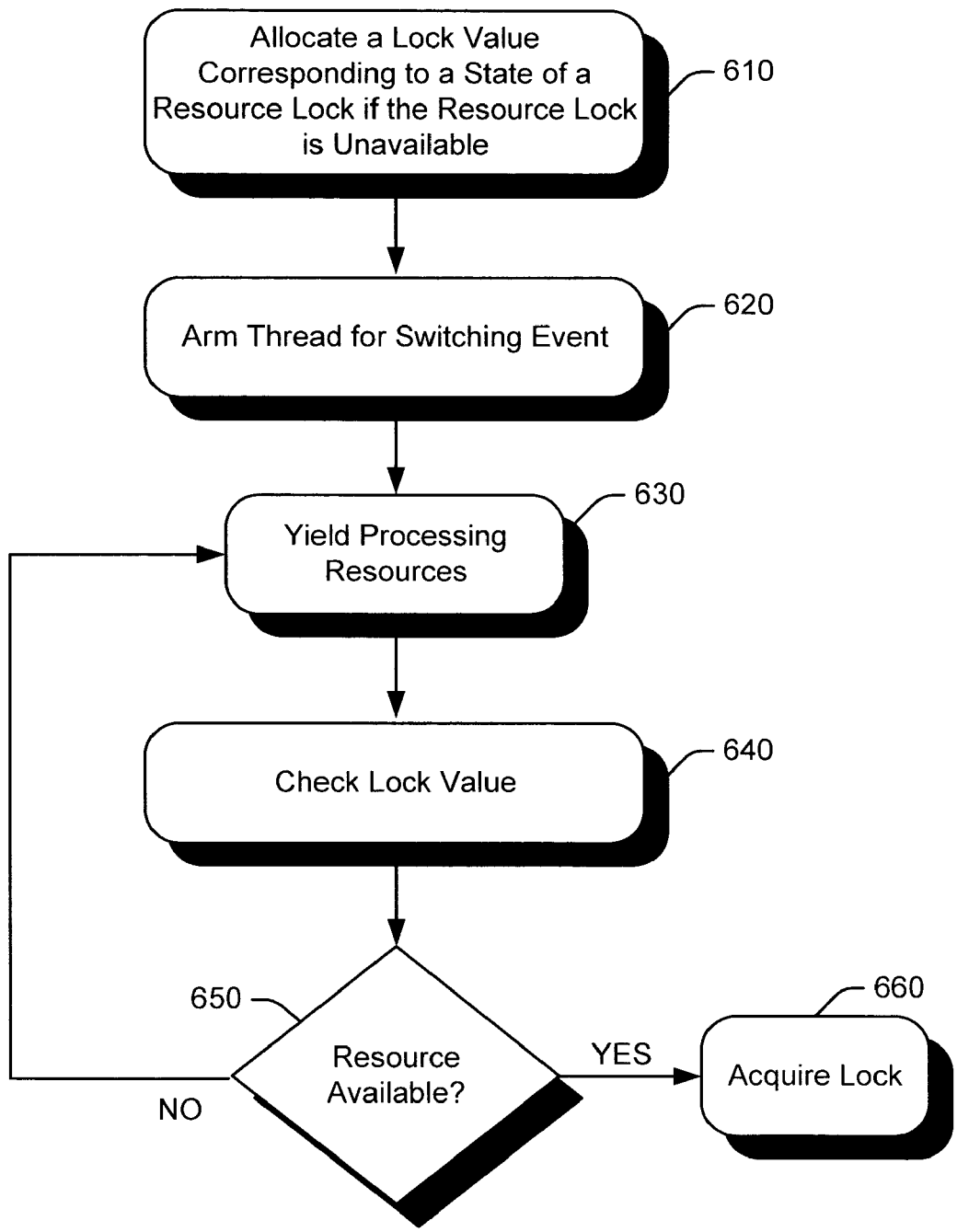

SYSTEMS AND METHODS OF SHARING PROCESSING RESOURCES IN A MULTI-THREADING ENVIRONMENT

TECHNICAL FIELD

The described subject matter relates to multi-threading, and more particularly to systems and methods of sharing processing resources in a multi-threading environment.

BACKGROUND

In multi-threading computing systems, multiple threads may need access to a shared resource. Some shared resources (e.g., a database) cannot be accessed simultaneously or changes made to the shared resource may not be properly recorded. Accordingly, the shared resource may be "locked" during use to prevent simultaneous access.

Multi-processor environments implement a "spin-lock" procedure wherein a processor waiting for a shared resource lock to be released by another processor repeatedly checks the lock status. However, the spin-lock procedure is inefficient in a multi-threading environment where a thread waiting for a shared resource lock to be released may block processing resources for other threads executing on the same processor.

The thread may yield processing resources to another thread while waiting for a resource lock to be released. However, the other thread may dominate the processing resources, preventing the yielding thread from checking the lock status for the shared resource. When the processing resources are finally returned to the yielding thread, the shared resource may already be locked by another processor.

BRIEF DESCRIPTION OF THE DRAWINGS

FIG. 4 is an exemplary address table for sharing processing resources in a multi-threading environment.

FIG. 6 is a flowchart illustrating exemplary operations which may be implemented to share processing resources in a multi-threading environment.

DETAILED DESCRIPTION

Figure 1:
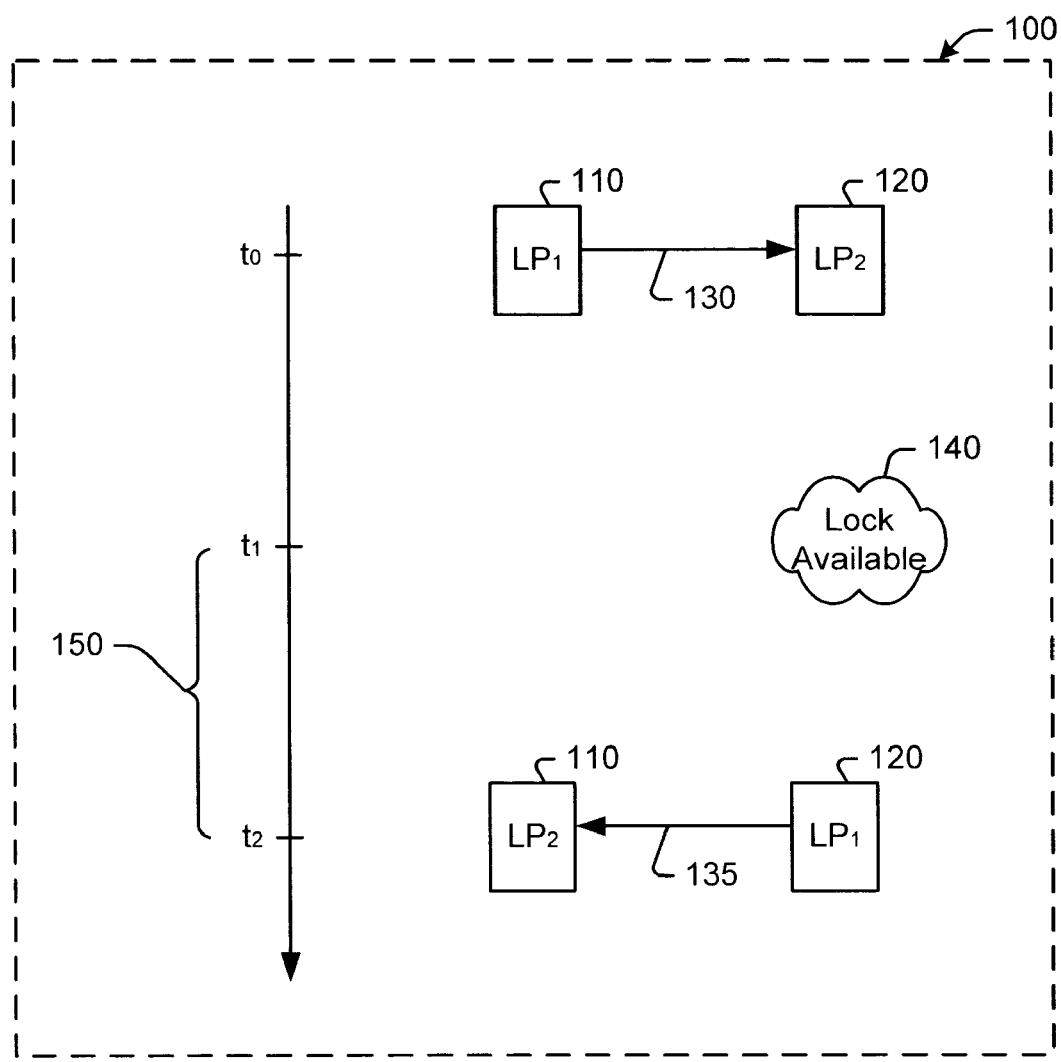
FIG. 1 is an exemplary temporal diagram illustrating sharing processing resources in a multi-threading environment.

Briefly, systems and methods described herein may be implemented to share processing resources in a multi-threading environment. FIG. 1 is an exemplary temporal diagram 100 illustrating sharing processing resources in a multi-threading environment. The term "multi-threading" refers to computing systems which execute program code in threads. "Threads" are a portion of program code that may be executed independently and concurrently with other portions of the same program code, e.g., on the same processing unit.

At time $t_0$, a first thread 110 waits for a shared resource that has been "locked" by another thread or processing unit in the multi-threading environment. While the first thread 110 is waiting for the shared resource to become available, other threads may be executed by the same processing unit. Therefore, thread 110 yields processing resources to a second thread 120, as illustrated by arrow 130.

Some time later (e.g., at time $t_1$), the shared resource becomes available (e.g., the lock is released), as illustrated in FIG. 1 at cloud 140. At time $t_2$, the second thread 120 returns processing resources to the first thread 110, as illustrated by arrow 135. Exemplary embodiments described herein may be implemented to minimize delta t or latency 150 from the time $t_1$ when the shared resource becomes available and time $t_2$ when the processing resources are returned to the first thread 110.

Accordingly, the systems and methods described herein monitor one or more memory addresses on behalf of a thread which then gives up its execution resources for use by another thread. A mechanism is provided whereby the yielding thread is returned to the foreground as soon as the addresses being monitored are updated to optimize response time.

Exemplary System

Figure 2:
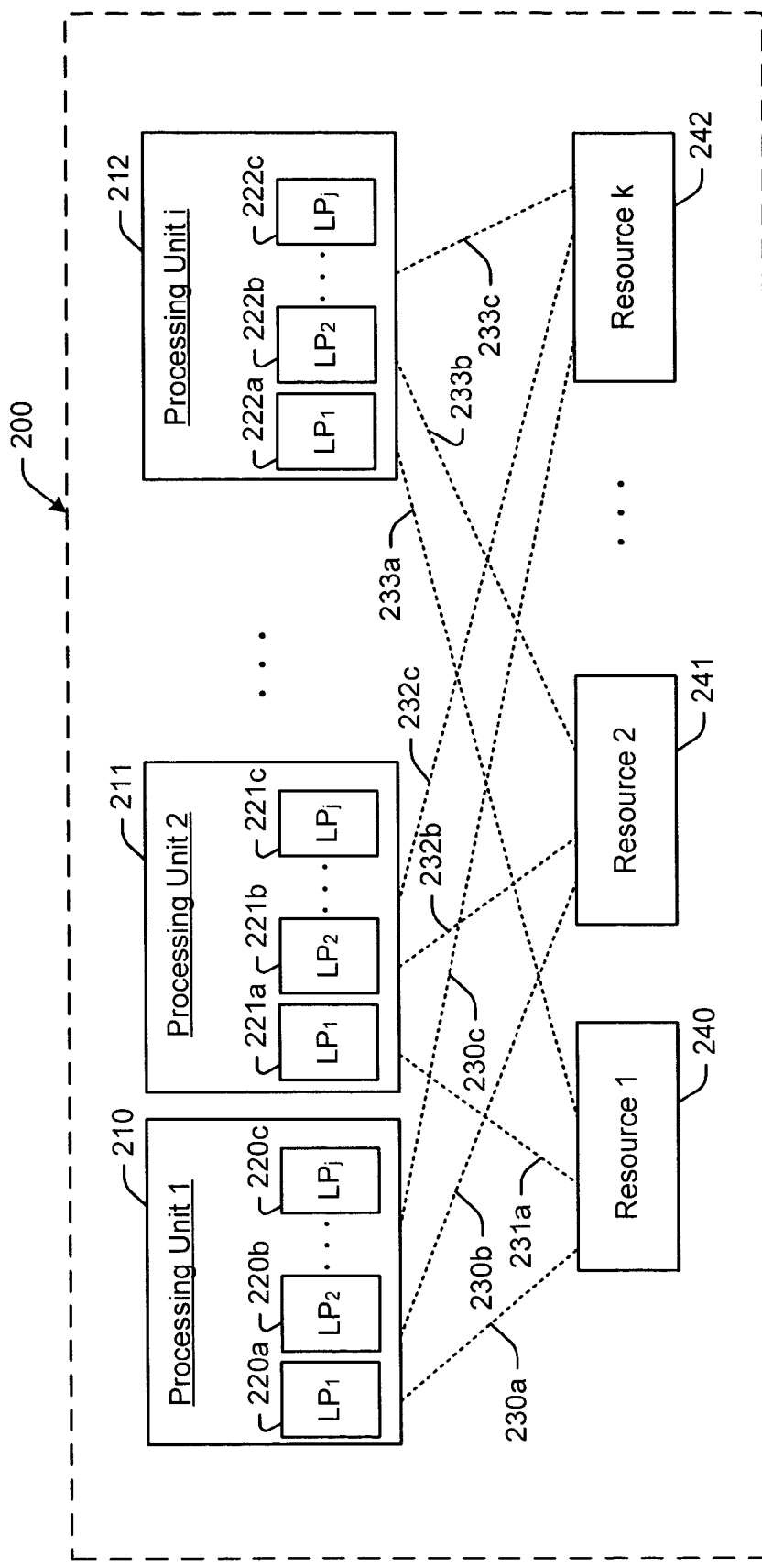
FIG. 2 is a high level schematic diagram of an exemplary multi-threading environment.

FIG. 2 is a high level schematic diagram of an exemplary multi-threading environment 200. In an exemplary embodiment, multithreading environment 200 may include a number of processors or processing units 210-212 (hereinafter collectively referred to as processing units 210), such as may be provided in a server computer. Each processor 210 may include one or more logical processors, such as the logical processors 220a-c, 221a-c, and 222a-c (hereinafter collectively referred to as logical processors 220) for executing threads 230a-c, 231a-c, and 232a-c (hereinafter collectively referred to as threads 230). Executing the threads 230 may require access to one or more shared resources 240-242 (hereinafter collectively referred to as shared resources 240), such as, e.g., a database.

The term "logical processor" is used herein to describe one or more processing resources (e.g., hardware) on a processing unit that may be implemented to execute one or more threads in a multi-threading environment. A processing unit may establish and "tear down" logical processors based on the number of threads being executed by the processing unit. Accordingly, a processing unit may have any number of logical processors (including no logical processors) at one or more times during operation.

It is noted that processing units 210 do not need to implement logical processors 220 to be used in multi-threading environment 200. For example, multi-threading environment 200 may include one or more processing units 210 with logical processors 220 for executing threads, and one or more processing units which do not execute threads (not shown). Due to the nature of the processing units 210 which implement logical processors 220 (i.e., as described above, a processing unit which executes threads may have no logical processors at one or more times), it is possible to have a multi-threading environment 200 even if there are no logical processors at one or more times during operation.

It is also noted that exemplary embodiments described herein are not limited to being implemented in multiple processor server computers. Multithreading environments may be implemented in other computing devices, including but not limited to laptop or personal computers (PCs), workstations, appliances, etc. Multi-threading environments may also be implemented in single-processor computing devices.

Before continuing, it is noted that shared resources 240 may include any local and/or remote device, data, and/or program code. For example, shared resources 240 may include server computers, network connections or other communication devices, computer storage or memory, printers, etc. Shared resources 240 may also include data and/or program code, such as, e.g., files, folders, software, databases, etc.

Simultaneous access to one or more shared resource 240 in a multi-threading environment 200 may be restricted or prohibited so that changes made by one thread are properly recorded before being accessed by another thread. Therefore, the shared resource 240 may be "locked" for the exclusive use of a particular thread (e.g., thread 230a) to prevent simultaneous access by other threads (e.g., read 231a). If a shared resource 240 is locked, the other threads (e.g., thread 231a) have to wait for the lock to be released before being provided access to the shared resource 240. During this time, the thread (e.g., 231a) waiting for the shared resource 240 may yield processing resources for executing threads which do not require access to the shared resource 240.

Figure 3A:
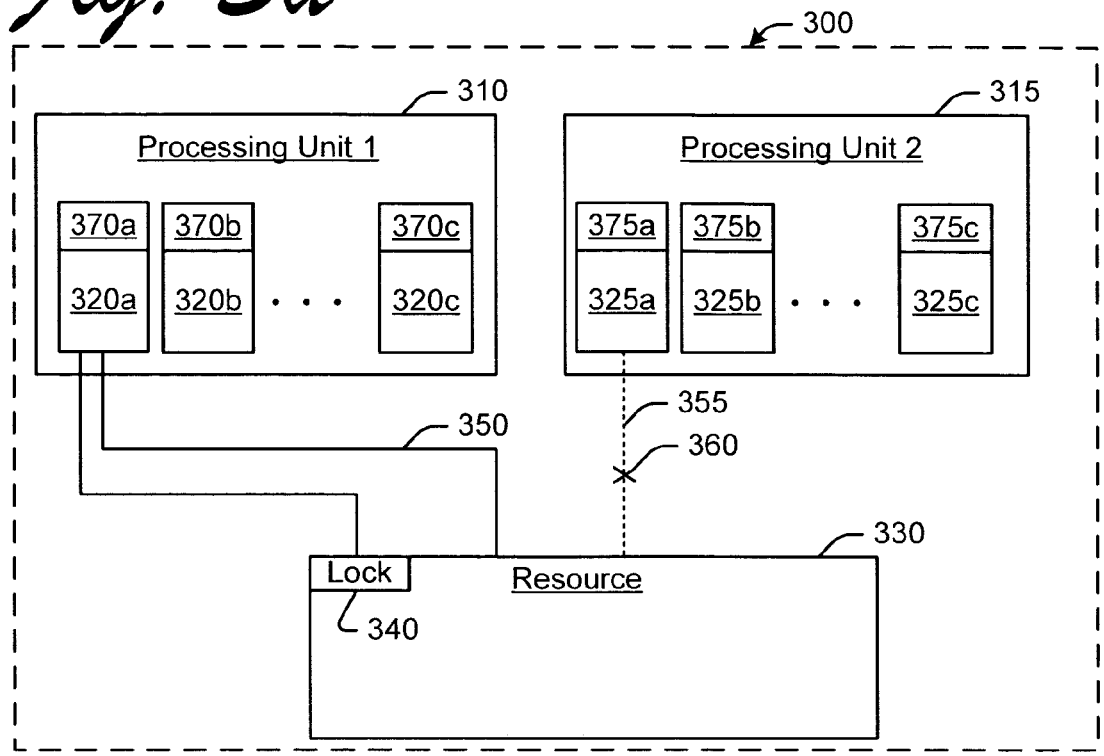
FIGS. 3a and 3b are high level schematic diagrams illustrating operation of a resource lock in a multi-threading environment.
Figure 3B:
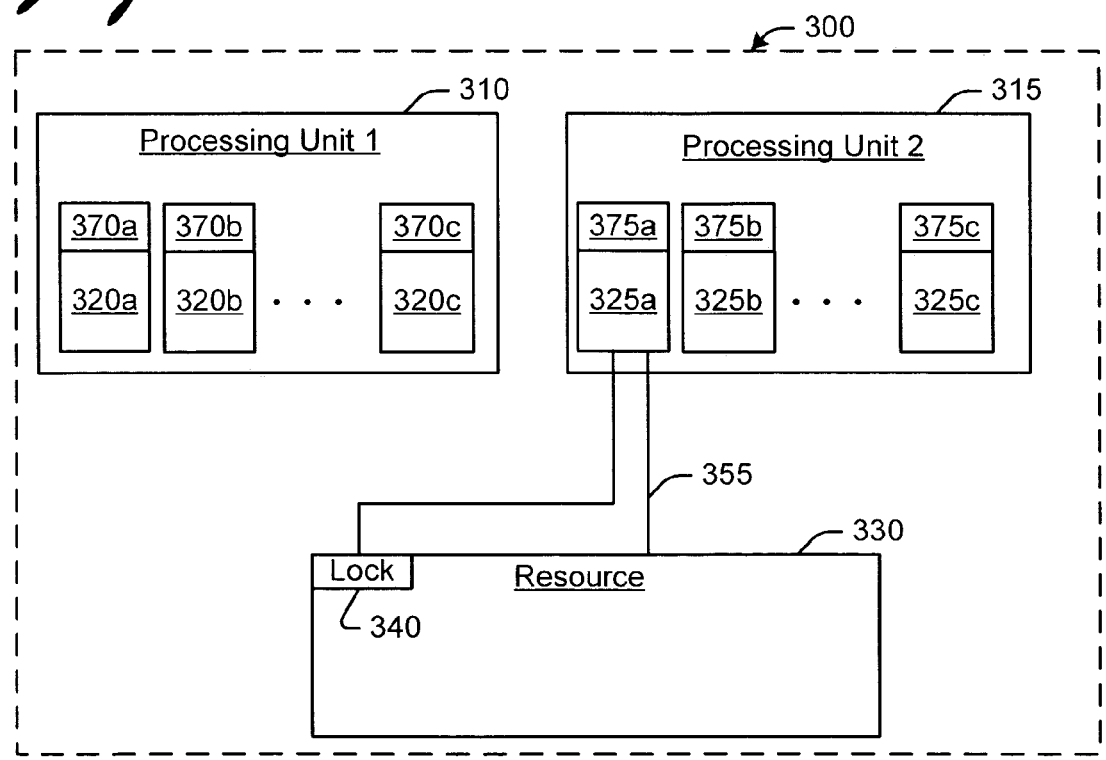

FIGS. 3a and 3b are high level schematic diagrams illustrating operation of a resource lock in a multi-threading environment 300. For purposes of this illustration, processing unit 310 having logical processors 320a-c and processing unit 315 having logical processors 325a-c are shown executing threads that require exclusive access to a shared resource 330. As discussed above, however, multi-threading environments are not limited to any particular configuration.

In FIG. 3a, logical processor 320a acquired lock 340 for the shared resource 330 so that thread 350 has exclusive access to the shared resource 330. Of course it is noted that shared resource 330 does not have to be locked by a logical processor and may instead be locked by a processing unit (e.g., the processing unit 310). In any event, other threads cannot access the shared resource 330 while it is locked, as illustrated by the "X" 360 across thread 355 in FIG. 3a.

Logical processor 320a may release lock 340 for the shared resource 330, e.g., after thread 350 has executed. Other threads may access the shared resource 330 after the lock 340 is released. In FIG. 3b, logical processor 325a acquired lock 340 for the shared resource 330 after the lock 340 was released by logical processor 320a. Accordingly, thread 355 now has exclusive access to the shared resource 330. However, it is noted that any of the other logical processors may acquire the lock 340 after it is released. For example, another logical processor on the same processing unit 310 (e.g., logical processors 320b or 320c) may acquire the lock 340 after it is released.

In exemplary embodiments, logical processor 325a executing a first thread 355 may yield processing resources at the processing unit 315 for other threads (e.g., executing on logical processors 325b and 325c) when the shared resource 330 is unavailable for the first thread 355. Before yielding processing resources, however, a state of the resource lock 340 may be allocated in memory, e.g., by allocating a state indicator or lock value in an address table 375a. When logical processor 320a releases the lock 340, each of the address tables 370a-c and 375a-c having a lock value allocated for the resource lock 340 may be updated to indicate that the state of lock 340 has changed (i.e., it is available). Accordingly, the lock 340 may be acquired for thread 355 and processing resources may be returned to logical processor 325a to execute first thread 355.

Before continuing, it is noted that the exemplary embodiment shown and described with reference to FIG. 3 includes address tables 370a-c and 375a-c provided for each logical processor 320a-c and 325a-c in the multithreading environment 300. In other exemplary embodiments, however, a single address table may be provided for each processor 310, 315, or a single address table may be provided for the multi-threading environment 300. It is also noted that address tables may be established and unassembled on an as-needed basis. Still other embodiments are also contemplated.

FIG. 4 is an exemplary address table 400 for sharing processing resources in a multi-threading environment. Exemplary address table 400 may be may be implemented, e.g., as a data structure including a number of data fields. Exemplary data fields may include one or more Entry fields 410a-d, Register ID fields 420a-d, Memory Address fields 430a-d, and State fields 440a-d.

If a shared resource is locked (e.g., by another processor or thread), a logical processor may allocate an entry (e.g., Entry 410a) in address table 400 to monitor the state of the resource lock. Other entries may also be allocated (e.g., for monitoring other resources).

The entries may include a register ID, memory address, and state of the resource. When the resource becomes available, the state of the shared resource is updated, e.g., by the logical processor (or processing unit) releasing the resource lock, or by a dedicated logical processor (or processing unit).

In an exemplary embodiment, a lock value ("1") may be written to State field 440 if a shared resource is unavailable (e.g., it is locked). When the shared resource is available (e.g., the resource lock is released), an entry in the address table 400 corresponding to the resource lock may be updated, e.g., by invalidating the lock value or writing a "0" to the corresponding State field 440.

In the example above, the lock value is binary (0 or 1). However, it is noted that the lock value may be implemented in any of a variety of different ways to indicate the state of the resource lock. Other embodiments will be readily apparent to those having ordinary skill in the art after becoming familiar with the teaching herein.

If the first thread yields the processing resources to another thread, the lock availability notification is caused by invalidating an entry in the address table corresponding to the memory address for the resource lock, and it is this invalidation that is the switching event which returns the processing resources back to the yielding thread. The yielding thread then executes its locking sequence code and either wins the lock or finds the lock unavailable again. If the lock is unavailable, the yielding thread simply re-allocates the lock address into the address table and yields again, waiting to be awakened the next time the lock is available.

For purposes of illustration, address table 400 may be implemented by a first thread to yield processing resources to other threads while the resource is locked. The processing unit is automatically notified when the lock becomes available and may be acquired for the first thread. If the lock is acquired for another thread before the resource lock can be acquired for the first thread, the address table may be updated again to indicate that the shared resource is unavailable and the first thread can again yield processing resources to other threads until the shared resource is available.

It should be understood that the exemplary address table 400 shown in FIG. 4 is provided for purposes of illustration and is not intended to be limiting. Other embodiments will also be readily apparent to those having ordinary skill in the art after becoming familiar with the teachings herein. For example, other embodiments may not include each of the data fields shown in FIG. 4, and/or may include additional data fields not shown in FIG. 4. In other examples, the data fields do not need to be maintained in a table format. Still other embodiments are also contemplated.

Figure 5:
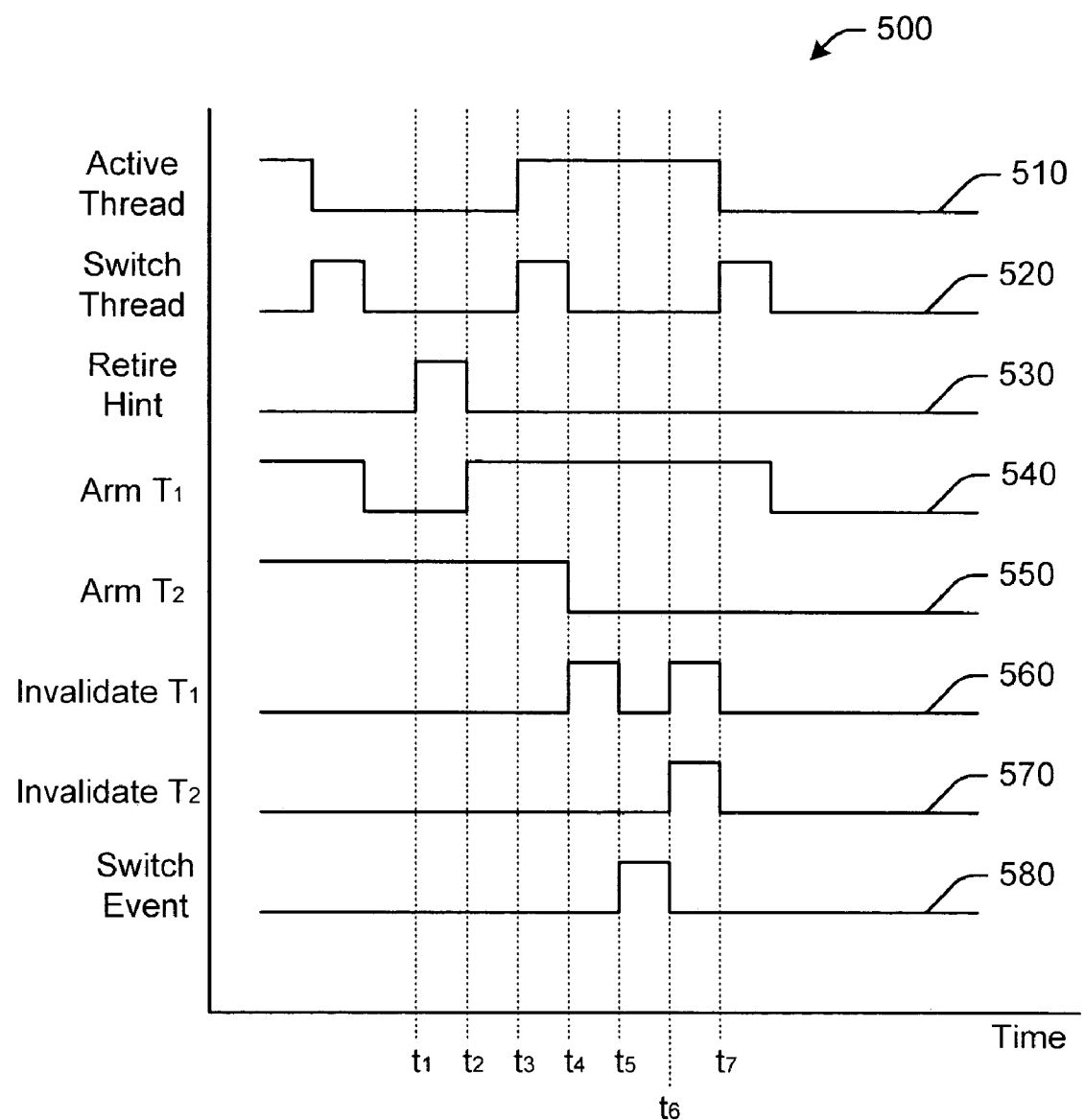
FIG. 5 is an exemplary waveform diagram illustrating sharing processing resources in a multi-threading environment.

FIG. 5 is an exemplary waveform diagram 500 illustrating sharing processing resources in a multi-threading environment. Waveform diagram 500 may be better understood as follows. The Y-axis identifies the waveforms and the X-axis represents time (t). The active thread waveform 510 goes high when a first thread is active, and goes low when a second thread is active. The switch thread waveform 520 goes high to switch between active threads. The retire hint waveform 530 goes high to execute a hint instruction (e.g., to yield processing resources to another thread). The arming waveforms 540, 550 go high to arm the respective thread T1 or T2. The invalidate waveforms 560 and 570 go high in response to an invalidation event for the respective thread T1 or T2 (e.g., if a lock value in the address table is invalidated or otherwise changes). The switch event waveform 580 goes high if the invalidation event triggers a switching event.

Waveform diagram 500 illustrates the following examples. At time $t_1$, the first thread is active (waveform 510 is low). However, the first thread may need access to a shared resource that is locked. Therefore, a hint instruction is executed at time $t_2$ (waveform 530 goes high) to arm the first thread. At time $t_3$, the first thread yields processing resources (waveform 520 goes high) and the second thread becomes active (waveform 510 goes high).

At time $t_4$, an invalidation event occurs for the first thread (waveform 560 goes high). For example, an entry in the address table for the first thread may be invalidated to indicate the shared resource is available (i.e., the lock is released). The validation event coupled with the first thread being armed at time $t_4$ (waveform 540 is high) triggers a switching event at time $t_5$. In response, the second thread releases processing resources for the first thread, and the first thread becomes active at time $t_7$ (waveform 510 goes low).

Waveform diagram 500 also illustrates that an invalidation event does not always result in a switching event. For example, an invalidation event for the thread occurs at time $t_6$ (waveform 570 goes high). However, the second thread is not armed at time $t_6$ (waveform 550 is low). That is, the second thread is not waiting for a shared resource. Therefore a switching event is not triggered (waveform 580 remains low).

The waveform diagram 500 also illustrates all invalidation events for a thread may be checked if a thread is armed. For example, an invalidation event occurs for the first thread at time $t_6$ (waveform 560 goes high). Because the first thread is still armed at time $t_6$ (waveform 540 is high) the address table may be checked again to determine if the invalidation event results in a switching event. Checking the lock value in response to any switching event reduces latency between the time a resource lock is released and the time the resource lock can be acquired by the yielding thread.

It is noted that there may be variations of the "wakeup" logic. An exemplary embodiment (described above) provides for any invalidation in the address table to trigger a switching event. This embodiment optimizes response time by having the yielding thread check lock availability every time there is an invalidation (e.g., indicating at least one lock is available). In a second exemplary embodiment, only a predetermined switching event (or set of switching events) may result in the switching event. For example, predetermined switching events include, but are not limited to, events triggered by specified types of resources, events triggered at a specified time or times, only lock invalidations, etc. This embodiment optimizes response time by having the yielding thread only check lock availability if there is an invalidation predetermined to result in the desired lock being available.

It is understood that although a 2-bit vector is may be implemented to share processing resources between two threads in FIG. 5, an n-bit vector may be implemented to share processing resources between any number (n) of threads.

A portion of exemplary program code is illustrated below which may be used to allocate the lock value and arm the thread for a switching event, e.g., as described above with reference to FIG. 5. The exemplary program code is written in assembly language, although this is not a requirement.

```
            invala
         ;;
            ld.a       rX = [rLockAddr]
         ;;
loop
            ld.c.nc         rX = [rLockAddr]
            cmp.eq     pLockFree, pLockBusy = LockFreeValue, rX
         ;;
(pLockBusy) hint       @pause
(pLockBusy) br         loop
         ;;
            acquire_lock( )
```

The first line of program code includes an invalidate instruction (invala). The invalidate instruction serves to mark all entries of the address table as invalid. The second line of code is a load instruction (ld.a), which causes an allocation of an address into the address table and the entry to be marked valid. The third line of code is a load instruction which checks the most recent lock value and writes the lock value (e.g., in the address table). For example, a lock value "1" may indicate that the resource lock is unavailable. The fourth line of code is a compare instruction which determines if the resource lock is available. If the resource lock is unavailable (pLockBusy), processing resources may be yielded to other threads. The program code loops until the resource lock is released, at which time the resource lock may be acquired.

It is noted that the exemplary program code provided herein is illustrative of suitable program code which may be implemented for sharing processing resources in a multi-threading environment, and it is not intended to be limiting.

Before continuing, it should be understood that the exemplary implementations discussed above are provided for purposes of illustration. Still other implementations are also contemplated.

Exemplary Operations

FIG. 6 is a flowchart illustrating exemplary operations which may be implemented to share processing resources in a multi-threading environment. Operations 600 may be embodied as logic instructions executable by a processor to implement the described operations. In an exemplary embodiment, the components and connections depicted in the figures may be used to implement the operations.

In operation 610, a lock value corresponding to a state of a resource lock is allocated if the resource lock is unavailable. In operation 620, a thread waiting for the resource lock to become available is armed for a switching event. In operation 630, processing resources are yielded for one or more other threads. In operation 640, the lock value is checked, e.g., in response to a switching event. If the shared resource is available in operation 650, e.g., as indicated by the lock value, the lock is acquired for the yielding thread in operation 660. If the shared resource is not available in operation 650, e.g., as indicated by the lock value, operations loop. For example, operations may return to operation 630 to continue yielding processing resources until the shared resource becomes available in operation 650.

The operations shown and described herein are provided to illustrate exemplary embodiments of sharing processing resources in a multi-threading environment. It is noted that the operations are not limited to the ordering shown. For example, operations 610 and 620 may be reversed or be executed simultaneously. Still other operations may also be implemented.

In addition to the specific embodiments explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method of sharing processing resources in a multi-threading environment, comprising:
   executing a first thread that requires access to a shared resource;
   if the shared resource is unavailable to the first thread:
   allocating a memory address with a lock value for the shared resource, wherein the memory address is associated with the first thread and the lock value indicates a state of the shared resource;
   arming the first thread for a switching event on the allocated memory address;
   yielding by the first thread at least a portion of the processing resources for a second thread that does not require access to the shared resource;
   while the second thread uses the at least a portion of the processing resources, performing the steps of:
   checking the lock value at the memory address by the logical processor in response to an occurrence of the switching event, wherein the switching event comprises updating, by a logical processor releasing the shared resource, the lock value for the shared resource;
   if the lock value indicates the shared resource is available:
   returning, by the second thread, the at least a portion of the processing resources to the first thread; and
   acquiring by the logical processor the shared resource for the first thread.

2. The method of claim 1 further comprising checking the lock value in response to a switching event only if the first thread is armed.

3. The method of claim 1 further comprising checking the lock value in response to any switching event to reduce latency between releasing a lock for the shared resource and acquiring the resource lock for the first thread.

4. The method of claim 1 further comprising checking the lock value in response to predetermined switching events to reduce latency between releasing a lock for the shared resource and acquiring the resource lock for the first thread.

5. The method of claim 1 further comprising checking availability of the shared resource if the lock value indicates the shared resource is available.

6. The method of claim 1 further comprising maintaining an address table for each of a plurality of threads, wherein allocating the memory address of the lock value is in the address table for a yielding thread.

7. The method of claim 6 further comprising updating the lock value in the address table for each of the plurality of threads if the corresponding shared resource is released.

8. A system comprising:
   a multi-threading processing unit;
   a first logical processor executing a thread on the multi-threading processing unit, wherein the thread requires access to a shared resource;
   if the shared resource is unavailable to the first thread, the first logical processor performing the steps of:
   allocating a memory address with a state indicator for the shared resource, wherein the memory address is associated with the thread;
   arming the thread for a switching event on the allocated memory address;
   yielding the at least a portion of the processing resources for executing a second thread that does not require access to the shared resource;
   checking the state indicator at the memory address in response to an occurrence of the switching event, wherein the switching event comprises updating, by a logical processor releasing the shared resource, the state indicator for the shared resource; and
   if the state indicator indicates the shared resource is available:
   a second logical processor returning the at least a portion of the processing resources from the second thread to the first logical processor; and
   acquiring by the first logical processor the shared resource for the thread.

9. The system of claim 8 wherein the state indicator is allocated in an address table for the first logical processor.

10. The system of claim 9 wherein the multi-threading processing unit checks the state indicator for any change recorded in the address table for the first logical processor.

11. The system of claim 9 wherein the multi-threading processing unit only checks the state indicator for a change recorded in the address table for the first logical processor if the first logical processor is armed.

12. The system of claim 8 wherein the first logical processor continues to yield the at least a portion of processing resources until a lock is acquired for the shared resource.

13. A system for sharing processing resources in a multi-threading environment, comprising:
   means for executing a first thread that requires access to a shared resource;
   means for allocating a memory address with an indicator means for the shared resource if the shared resource is unavailable to the first thread, wherein the memory address is associated with the first thread;
   means for arming the first thread for a switching event on the allocated memory address;
   means for causing the first thread to yield at least a portion of the processing resources for a second thread that does not require access to the shared resource;
   means for invalidating the indicator means if the shared resource is released;
   means for checking the indicator means at the memory address in response to an occurrence of the switching event,
   means for returning the at least a portion of the processing resources to the first thread if the lock value indicates the shared resource is available; and
   means for acquiring the shared resource for the first thread.

14. The system of claim 13 further comprising means for checking the indicator means in response to any switching event to reduce latency between releasing the resource lock and acquiring the resource lock for the first thread.

* * * * *

UNITED STATES PATENT AND TRADEMARK OFFICE
CERTIFICATE OF CORRECTION

| | | |
|---|---|---|
| PATENT NO. | : 7,856,636 B2 | Page 1 of 1 |
| APPLICATION NO. | : 11/125859 | |
| DATED | : December 21, 2010 | |
| INVENTOR(S) | : Rohit Bhatia et al. | |

It is certified that error appears in the above-identified patent and that said Letters Patent is hereby corrected as shown below:

IN THE SPECIFICATIONS:

In column 5, line 32, delete "the thread" and insert -- the second thread --, therefor.

Signed and Sealed this
Twenty-second Day of March, 2011

David J. Kappos
*Director of the United States Patent and Trademark Office*